United States Patent [19]

Brim

[11] Patent Number: 5,687,993
[45] Date of Patent: Nov. 18, 1997

[54] DUAL CONTAINMENT SYSTEM FOR TRANSFERRING STERILE FLUIDS TO AND FROM A CONTAINER

[75] Inventor: Larry H. Brim, Logan, Utah

[73] Assignee: Hyclone Laboratories, Logan, Utah

[21] Appl. No.: 331,696

[22] Filed: Oct. 31, 1994

[51] Int. Cl.$^6$ .................. F16L 39/00; F16L 47/00
[52] U.S. Cl. .................. 285/131; 285/138; 285/133.1
[58] Field of Search ..................... 285/138, 133.1, 285/131, 256, 259, 45, 149, 239; 607/408; 222/94

[56] References Cited

U.S. PATENT DOCUMENTS

| | | | |
|---|---|---|---|
| 293,481 | 2/1884 | Magowan | 285/138 |
| 3,148,898 | 9/1964 | Somers | 285/149 |
| 3,251,390 | 5/1966 | Evans . | |
| 3,347,566 | 10/1967 | Nelson | 285/45 |
| 3,529,853 | 9/1970 | Triest et al. | 285/149 |
| 3,765,728 | 10/1973 | Perugua | 285/133.1 |
| 3,799,440 | 3/1974 | Goss et al. | 285/138 |
| 3,831,635 | 8/1974 | Burton | 285/149 |
| 3,963,026 | 6/1976 | Herb . | |
| 4,063,757 | 12/1977 | Fünrmann | 285/149 |
| 4,111,466 | 9/1978 | Deregibus | 285/138 |
| 4,114,929 | 9/1978 | Knapp | 285/45 |
| 4,240,482 | 12/1980 | Anderson et al. . | |
| 4,323,269 | 4/1982 | Pellenl | 285/133.1 |
| 4,511,163 | 4/1985 | Harris et al. . | |
| 4,588,402 | 5/1986 | Igari et al. . | |
| 4,591,049 | 5/1986 | Walter et al. . | |
| 4,597,594 | 7/1986 | Kalalieff et al. | 285/259 |
| 4,696,496 | 9/1987 | De Guelis et al. | 285/133.1 |
| 4,820,288 | 4/1989 | Isono . | |
| 4,922,971 | 5/1990 | Grantnam | 285/133.1 |
| 5,203,378 | 4/1993 | Williams | 285/133.1 |
| 5,259,651 | 11/1993 | Sharp | 285/138 |
| 5,285,744 | 2/1994 | Grantham et al. | 285/133.1 |

FOREIGN PATENT DOCUMENTS

| | | | |
|---|---|---|---|
| 659362 | 3/1963 | Canada | 285/133.1 |
| 1065308 | 5/1954 | France | 285/133.1 |

*Primary Examiner*—Eric K. Nicholson
*Attorney, Agent, or Firm*—Jonathan W. Richards; Workman, Nydegger & Seeley

[57] ABSTRACT

A dual containment system is taught for adding sterile or caustic chemical, pharmaceutical, and biological fluids to and withdrawing them from a container. Included is a dual containment enabling fitting having a set of small diameter barbs at each end of a hollow conduit and a set of enlarged inner barbs at each end of a raised portion at the center of the hollow conduit. A port plate with a barbed spout is affixed to an aperture on the container. Also included is a dip tube with one end attached to a small diameter barb on the fitting and the other end extending into the container through the port plate spout. A connecting sheath encompasses the external portion of the dip tube and is attached at one end to a large diameter barb on the fitting and at the other end to the barbed spout. This creates a secondary containment chamber between the dip tube and the connecting sheath. The fitting may also be connected in series with a distal similarly functioning fitting creating a secondary containment chamber that allows the dual containment transfer of fluids. The secondary containment chamber prevents leakage and contamination and may be used for coaxial fluid flow, to effect a gas exchange with the fluid contents, and to cool or heat the fluid.

18 Claims, 2 Drawing Sheets

5,687,993

DUAL CONTAINMENT SYSTEM FOR TRANSFERRING STERILE FLUIDS TO AND FROM A CONTAINER

BACKGROUND OF THE INVENTION

1. The Field of the Invention

The present invention relates generally to fluid storage and dispensing systems. More particularly, the present invention is directed to sterile, leakproof ports and transference conduits for adding biological, chemical, and pharmaceutical fluids to liquid containment systems, and for recirculating the fluids within, and dispensing them from, the liquid containment systems.

2. The Relevant Technology

Breakthroughs in the biological, pharmaceutical, and chemical fields are occurring at a rapid rate. In the process of the substantial research taking place and as a consequence of that research and of the many new applications introduced thereby, large amounts of sterile fluid materials are consumed. The high cost and risk incurred in shipping and distributing these materials using current known procedures is a hindrance to the research.

The fluid materials to be supplied and transported are often caustic, fragile, or expensive. It is also often required that they be maintained in a sterile environment. Accordingly, it is critical in handling these materials that an air-tight atmosphere be maintained to prevent their contamination and to prevent their escape to the outside environment. Consequently, the method of distributing the fluid materials must be safe, sterile, reliable, and leakproof. Business considerations require that it be economical as well. The standard methods known at the present time typically use plastic or stainless steel containers. To gain access to the materials in the containers, the containers are typically provided with some form of spout or port, most of which have been designed for bulk chemical or food dispensing where spillage and contact with the outside environment are not critical. As a means of tapping into the containers in a sterile manner, one method uses conduits fitted with O-rings that are insert fitted into openings in the ports. The drawbacks to this method are that a complicated functional design is required, with separate attachment and sealing means. It is quite expensive to guarantee the reliability of the seals, as the O-rings may deform or be damaged when pressed into place, causing leakage. This requires that each O-ring seal be separately tested.

A second method of tapping into containers consists of a barbed spout formed or welded on the container with a flexible hose pressed over the barb. This method is simple and more efficient, as the same mechanism accomplishes attachment and sealing, but it also has its drawbacks, as the barbed spout provides no means for attaching to a dip tube positioned within the container. Without the capability of access to a dip tube, it is much more difficult to withdraw materials stored in the containers, and the location of the ports on the containers may be limited.

A third method currently used is to form a threaded conduit in the wall of the container and thread a cap or bung into the conduit. The threads provide the attachment mechanism, and a rubber gasket creates a seal. This method may allow for the use of a dip tube, but requires separate sealing and attaching mechanisms. Also, the rubber gaskets may fail during use, and the threaded sections frequently leak and are a common location for the entry of contaminants.

Cell culture media used in the biological field is one example of sterile fluid materials that requires specialized distribution and storage methods. Scientists and technicians often require cell culture media for use in propagating cell and tissue cultures. Cell culture media is typically a solution of amino acids, electrolytes, serum, serum fractions, vitamins, and growth factors. Constituents of cell culture media are combined in quantities to adjust the pH, osmolarity, and other essential parameters for consistent and rapid cell growth therein. It is critical that outside bacteria not come in contact with the cell culture media as the bacteria will metabolize it. As a result of the increased costs and risks involved in shipping and storing liquid cell culture media, users of larger quantities of cell culture media generally purchase the media in a powdered form. This powdered form requires less storage space, is easier to ship, and remains stable over a longer period of time. However, the reconstitution of powdered cell culture media requires a sterilization process that lends itself well to disposable containment systems. The ports used with these systems must be easily attached, reliable, and easy to sterilize.

Some reconstitution or dispensing systems utilize a large plastic drum having a volumetric capacity sufficient to contain a large quantity of cell culture media. These drum-type dispensing systems often use ports comprised of materials different than the barrel. These ports often use threaded connections as discussed above. During heating or cooling, the disparity in the rates of expansion between the port and the barrel allows the media to migrate along the threads. This migration may lead to compromising the integrity of the barrel system. Contamination, therefore, can result due to exposure of the sterile fluids to the outside atmosphere through the threaded ports inserted into the bung hole of the barrel. Also, these systems require extensive sterilization equipment, as they must be sterilized every time they are used. Sterilization is made even more costly because the bulkiness of these systems makes them harder to sterilize and requires extensive operating space.

As a result of the need for a better containment system, disposable flexible bag-like containers have been utilized in the art. One example of flexible bag-like containers is the containment system taught in U.S. application Ser. No. 08/015,804, now U.S. Pat. No. 5,362,642 for Methods and Containment System for Storing Reconstituting Dispensing and Harvesting Cell Culture Media and U.S. Pat. No. 5,350,080 for Media Bag Port Fittings. These references are hereby incorporated into this disclosure.

These references teach a flexible system having an outer storage bag and an inner mixing bag. The inner mixing chamber formed within the mixing bag is capable of being placed in communication with one or more storage chambers formed in the storage bag. The mixing bag resides substantially within the outer storage chamber and is adapted to receive powdered cell culture media and other constituents therein. The mixing bag is also adapted to receive liquid cell culture media. When using powdered cell culture media, the liquid cell culture media is created by the introduction of both powdered and liquid constituents into the mixing chamber through an access port. Liquid cell culture media may be directly introduced into the storage chamber if sterile.

A pump and a sterilization filter may be located between the mixing chamber and storage chamber, which acts to transport the reconstituted cell culture media from the mixing chamber to the storage chamber through a tubing system located in fluid communication between the two chambers. The cell culture media is sterilized by the sterilization filter as it passes from the storage chamber. Thereafter, the media in the storage chamber may be either stored or immediately dispensed therefrom into a cell bioreactor.

To access the storage chamber, one port is affixed through a wall of the storage bag. A similar port is affixed through the walls of both the mixing bag and the storage bag for use in the introduction of materials into the mixing chamber of the mixing bag. A tubing system may be attached to barbed tubing connectors affixed within apertures formed through the ports allowing communication therethrough to the respective chambers therein.

The port system of the prior art comprises a body having a mounting flange and upstanding walls to which a mounting base is attached. Apertures are formed through the mounting base in which barbed tubing connectors are affixed. The barbed tubing connectors are so sized so as to provide a variety of attachment points for tubing used in various configurations as required by different systems. The port body is provided with a rubber gasket and is insert fit into an aperture formed in a mounting flange that is bonded or otherwise attached to the container wall.

The port system just described can provide multiple spouts in a single port and provides a means for extending a dip tube into the bag. While the containment system generally functions well, the port system requires special procedures to insert fit the port body into the aperture, and the aperture must be specially made for the port in a manner that is costly and renders it incompatible with bags not using the special ports. Therefore, this system also has drawbacks, and as can be seen from the above discussion, a need exists in the art for a port system to overcome the leakage, expense and compatibility shortcomings existent in the present systems.

In addition, in the chemical industry in general, dual containment systems are commonly used in processing hazardous chemicals. In general, the dual containment systems found in the prior art are rigid systems, primarily made out of rigid plastics, metal, or glass compound pipes. It will be readily appreciated that primary disadvantages of such rigid dual containment systems are the high cost to construct and maintain such systems as well as their lack of flexibility. The fitting of the present invention enables the construction of a low cost, flexible alternative to dual containment systems found in the prior art.

SUMMARY AND OBJECTS OF THE INVENTION

In light of the foregoing, it is an object of the present invention to provide a system for the transference of sterile fluids to and from liquid storage and dispensing systems.

It is also an object of the present invention to provide such a system that is leakproof and which allows the maintenance of a sterile environment for the fluid.

It is a further object of the present invention to provide such a system that does not require the use of O-Rings, threaded caps, or complicated interlocking systems and wherein sealing is effected by the same mechanism as that used for attaching.

It is yet a further object of the present invention to provide a system that may be attached to a universally sized externally formed port on a liquid storage and dispensing system and to allow that port to be positioned in any location on the storage and dispensing system.

It is also an object of the present invention to provide such a system that can be used with less expensive flexible sided bag-like storage systems that are disposable and do not require expensive sterilization procedures for the system with each use of the system.

It is a further object of the present invention to provide ports in conjunction with the system that can provide access to multiple chambers contained within the flexible sided bag in a bag storage systems.

It is still a further object of the present invention to provide such a system that allows connections to a dip tube to be made at external surfaces of the liquid storage and dispensing system for installation at the point of consumption.

It is yet a further object of the present invention to provide such a system that allows for dual containment tapping of liquid storage and dispensing systems, and dual containment transference of the fluids to or from the container.

It is still a further object of the present invention to provide such a system that allows for the exchange of gases to or from the liquid being transferred.

It is yet another object of the present invention to provide such a system that provides a method by which the liquid being transferred may be heated or cooled.

To achieve the foregoing and in accordance with the invention as embodied and described herein, the present invention comprises a dual containment system for transmitting sterile fluids to and from a container in a sterile and leakproof manner.

In practicing the present invention, a liquid containment system such as the flexible bag discussed above is utilized. A port plate is welded into an aperture in the bag, and a barbed spout is incorporated in the port plate. A dual containment enabling fitting is used that is designed as a conduit with a tubular opening running completely through it and, as a means of connection, an outward facing barb is provided at each end of the fitting. The proximal end of the fitting is for receiving a dip tube, and the distal end of the fitting is for receiving an external connection to the dip tube. The center portion of the fitting is raised and may comprise flat or rounded ribs extending radially outward from the conduit. A second set of barbs of greater diameter than the first set is located on the raised center portion with one barb on either side of the flat or rounded ribs facing outward.

A dip tube is located within the bag, and is preferably attached at one end to a seam in the inner wall at the bottom of the bag. A second end of the dip tube protrudes from the bag through the spout on the port plate and is inserted onto the small diameter barb on the proximal end of the fitting. A connecting sheath encompasses the external portion of the dip tube and is connected at one end to the barb on the port plate spout. The other end is connected to the large diameter barb on the proximal end of the raised portion of the fitting. The discharge tube attached over the small diameter barb on the distal end of the fitting completes the channel leading from the dip tube that is used for accessing the material within the bag. In this manner, the fitting secures two stages or layers of hoses, creating a secondary containment area functioning as an extension of the container over the external portion of the dip tube. This allows the connection to the dip tube to be made externally in order that it may be achieved by the end user at the point of consumption. It also enables the connection to be made without the need for an O-Ring, threaded fitting, complicated locking device, internal spout, or other disadvantageous sealing mechanism.

A second fitting of similar construction may also be utilized in series with the first to create a dual containment fluid transference conduit. This conduit is formed by connecting each end of an inner section of tubing having a first diameter corresponding approximately to the diameter of the fitting conduit to a small diameter barb at the exterior end of each fitting and encasing the inner tubing section with an outer section of tubing of a diameter greater than the inner section. The outer section of tubing is attached at each end to a large diameter barb on the raised portion at the interior of each of the fittings. This dual containment conduit is safer because two layers of tubing must fail before contaminants can enter into the inner tubing section and before the contents can be emitted to the outside environment. The secondary containment area created between the two tubes is also useful for other applications. With the use of multiple T-Joints in the outer layer of tubing, the secondary containment area may be flooded with heated or cooled liquids, thus causing a heating or cooling effect to the fluids being transmitted within the inner tubing. If inner tubing is used that is gas permeable but not liquid permeable, the secondary containment area may be used as a gas transfer chamber, whereby gas may be pumped into it and be incorporated into the liquid within the inner tubing, or whereby gas may be drawn out of it, thus relieving the fluid within the inner tubing of any gases carried in it. It may also be used for coaxial fluid flow, enabling the same fluid or two different fluids to flow in both the inner tubing section and the secondary containment area, either in the same or in opposite directions.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
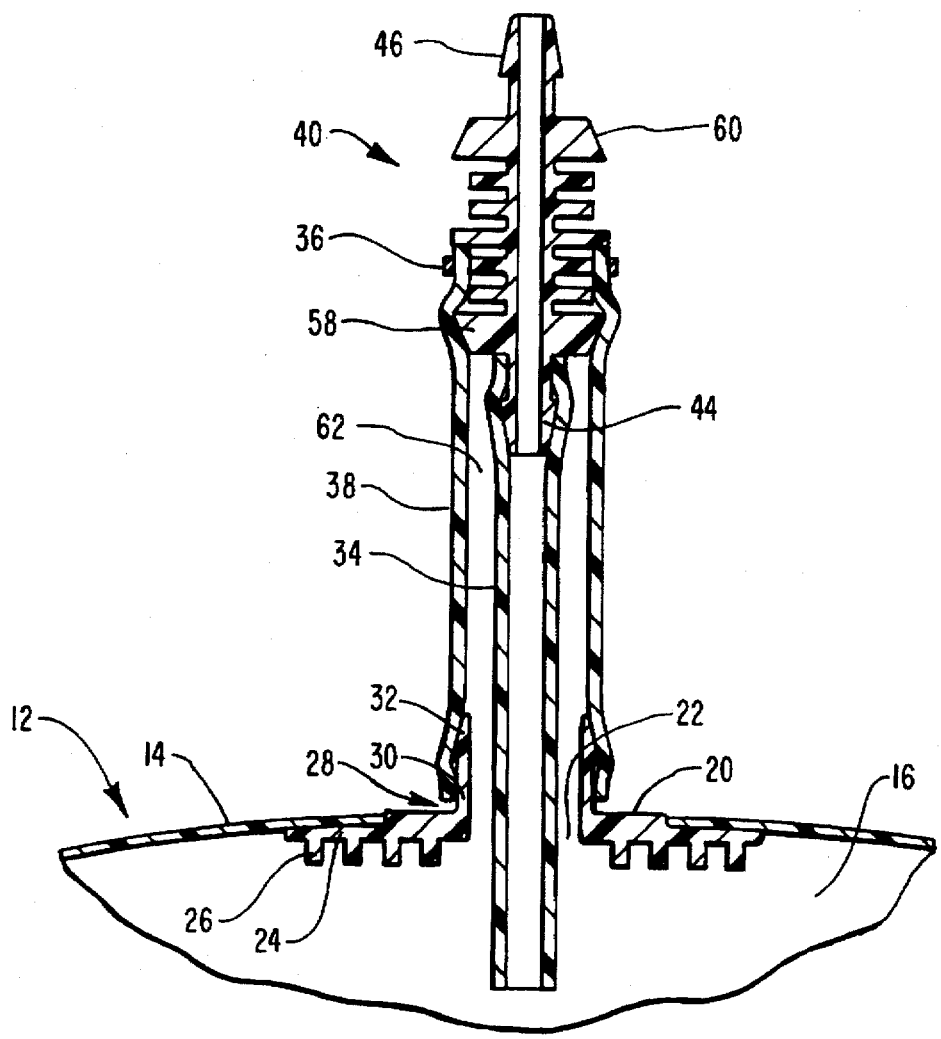
FIG. 1 is a cross sectional view of the dual containment port plate assembly system of the present invention.

FIG. 1 shows the elements of the dual containment sterile fluid transference system of the present invention. As presently contemplated, the system of the present invention is used with a container 12, the wall members of which may be either flexible or rigid. The container 12 may have single or multiple ply walls 14 and may be of the type disclosed in U.S. application Ser. No. 08/015,804 for Methods and Containment System for Storing Reconstituting, Dispensing and Harvesting Cell Culture Media and in U.S. Pat. No. 5,350,080 for Media Bag Port Fittings, each incorporated herein by reference. The container 12 may be of any type used for storing chemicals, pharmaceutical fluids, biological fluids, and other fluids where the maintenance of a sterile environment or the avoidance of leakage is important. In order to tap into the container 12 and gain access to the materials 16 inside the container 12, one or more port plates 20 are affixed to the container 12 using thermal or chemical bonding methods. The locations of the port plates 20 on the container 12 are not critical, for reasons that will be explained. However, a preferred location is the top surface, as this allows for easier access to the port plate 20 and greater side wall strength of the container 12.

In the preferred embodiment, the container 12 is flexible and is made from a multi-layered plastic material. Before the container 12 is sealed, a spout 28 on the port plate 20 is inserted through the container wall 14 from the inside, leaving a portion of the port plate 20 on the inside of the container. The port plate 20 is then bonded to the container using chemical or thermal methods known in the art. An inner support 24 may be incorporated into the port plate 20 for use in keeping the sides of the flexible container from collapsing around the aperture 22 and sealing it off. This is accomplished by ribs 26 on the inner support 24 that define channels that allow the fluid 16 to continue to travel to the aperture 22 until the container 12 is completely empty. The spout 28 extends outward from the face of the port plate 20 and consists of a conduit portion 30 with a barb 32 formed at its outer end facing outward. The conduit portion 30 of the spout 28 extends through the aperture 22 in the container wall 14, providing a channel for the contents 16 of the container 12 to enter or exit the container 12. The barbs utilized in the present invention are typically formed to comprise conical raised wedged sections that preferably terminate abruptly to form sharp edges. The diameter of the spout 28 must be suitably sized for the particular conduit to be used, which may vary with the application and the fluid material 16 to be contained. The outer diameter of the barb 32 should be somewhat larger than the inner diameter of the tubing to be used and the difference in diameter will vary with the elasticity of the tubing to be used, but should be selected to provide a tight fit when the tubing is pressed over the barb.

Figure 2:
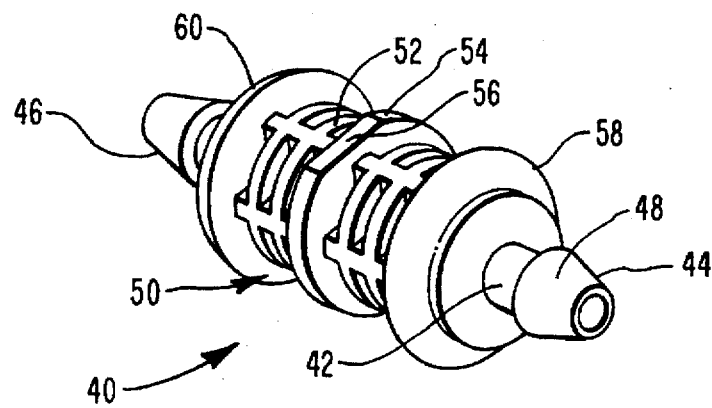
FIG. 2 is a perspective view of the dual containment enabling fitting of the present invention.

FIG. 2 shows the dual containment enabling fitting 40 that is also used as part of the system of the present invention and comprises a hollow conduit 42 of sufficient diameter that a dip tube may fit snugly around its outer diameter and still fit within the inner diameter of the spout 28. Typical inside diameters of tubing used in cell culture media applications, for example, are ¼", ⅜", or ½". The fitting may be formed of any satisfactory material, but bio-compatible thermoplastics are preferred. At each end of the conduit 42 of the fitting are two barbs 44, 46, hereafter referred to as small diameter barbs. One small diameter barb 44, 46 is fixed at each end of the fitting 40 facing outward. In the preferred embodiment, the small diameter barbs 44, 46 are formed without seams or molding lines on the external face 48 of the barb 44, 46. Molding lines provide a path for leakage, and their elimination allows for greater leak prevention and preservation of a sterile environment. Inward of the small diameter barbs 44, 46, at the center of the conduit section 42, is a raised portion 50 of greater diameter than the conduit section 42. In the preferred embodiment, the raised portion 50 contains ribs 52, for ease of molding and to reduce the amount of material needed to form the fitting 40. In the presently preferred embodiment, the ribs 52 extend radially from the fitting and are of uniform diameter, except for a center rib 54 that is of slightly greater diameter than the others to serve as a divider and a stopping point for tubing. In the presently preferred embodiment, the ribs 52 are circular, but the center rib 54 is provided with flattened edges 56 in order to provide a gripping surface for holding the fitting 40 with a tool for easier installation as well as to prevent the fitting from rolling on a flat surface. At each end of the raised portion 50 is a barb 58, 60 of larger diameter than the small diameter barbs that will be hereafter referred to as the large diameter barbs. The two large diameter barbs 58, 60 also face outward and are of similar construction to the small diameter barbs 44, 46, though of a greater diameter. The second barb 60 could be omitted for the port plate assembly application, but it is useful for further applications, as will be seen. The raised portion 50 in the presently preferred embodiment is about ¾" in diameter in order to fit ¾" tubing. This allows for compatibility with standard port sizes in the industry, though the size may vary to fit the needed application. The diameter of the barbs 58, 60 should be somewhat greater than this to provide a snug fit. The two sides of the fitting 40 are uniform mirror images of each other, and are interchangeable.

FIG. 1 depicts the preferred configuration of the port plate assembly of the dual containment sterile fluid transference system of the present invention. The dip tube 34 is located within the container and, in the presently preferred embodiment, one end of the dip tube 34 is located at the bottom of the container 12 where it is preferably secured to a seam in the container wall 14. A primary function of the dip tube 34 is to enable the continuous flow of fluid 16 from within the container 12 regardless of the location of the port plate 20 on the container 12. A second end of the dip tube protrudes from the spout on the port plate and is connected to the small diameter barb 44 on the proximal end of the fitting 40. The connection is made by pressing the dip tube 34 over the barb 44 until it extends past the enlarged end of the barb 44. For further security, the portion of the tube extending past the enlarged edge of the barb may be secured with a fastening device such as a Nylon cable tie 36.

A connecting sheath 38 is used to fully enclose the portion of the dip tube 34 that is external to the container 12, such that the external portion of the dip tube 34 is encompassed within the connecting sheath 38. The connecting sheath 38 is advanced over the external portion of the dip tube and one end of the connecting sheath 38 is pressed over the barb 32 on the spout 28, in the same manner as described above in regard to the dip tube and is optionally fastened in place with a cable tie 36. The other end of the connecting sheath 38 is pressed in a like manner over the large diameter barb 58 on the proximal end of the fitting 40. In this manner, the full extent of the external portion of the dip tube 34 is enclosed within the connecting sheath 38, creating a secondary barrier or containment area 62, sealing off the full exterior surface of the dip tube. In the presently preferred embodiment, the dip tube is smaller than the inside diameter of the spout 28. This allows fluid from within the container 12 to flood into the secondary containment area 62 at the port assembly 20, making the secondary containment area, in effect, an extension of the container.

Figure 3:
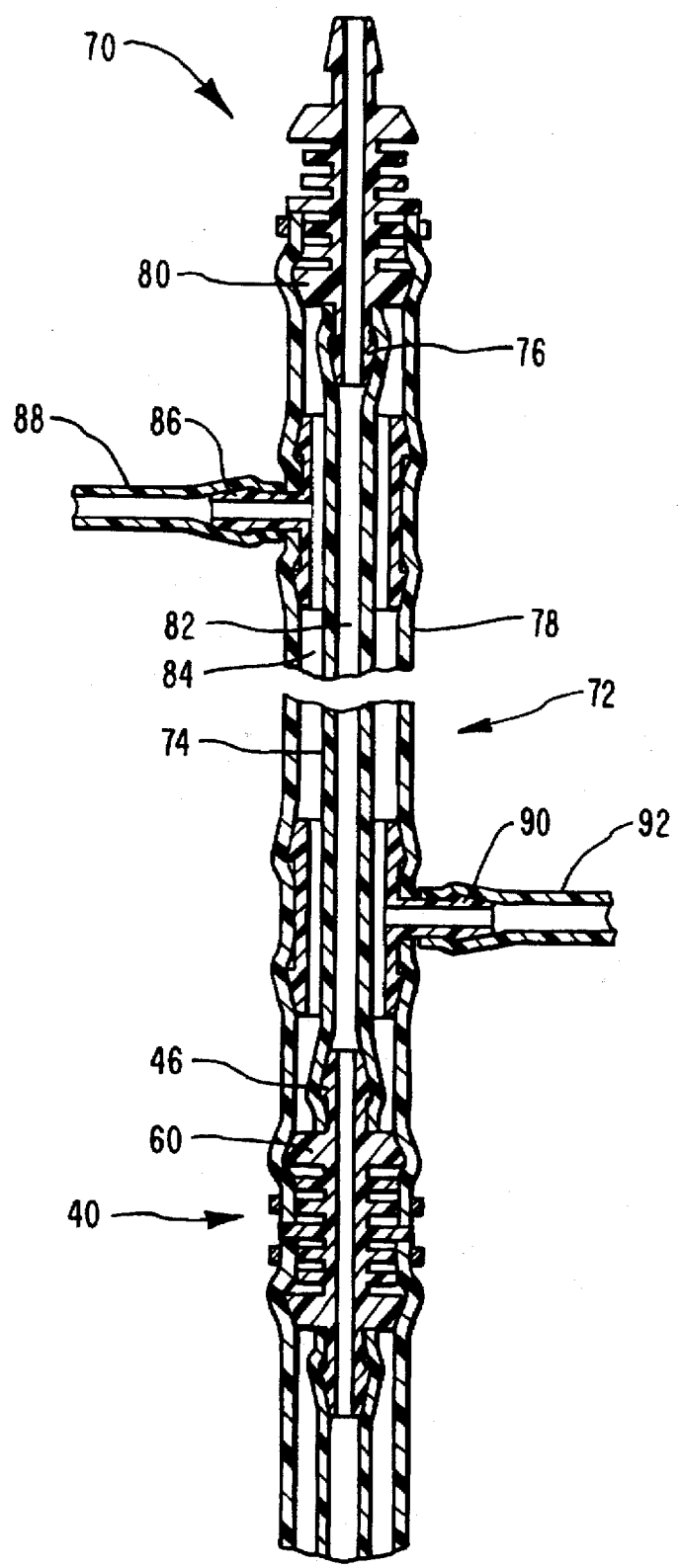
FIG. 3 is a cross sectional view of the dual containment system of the present invention with a first dual containment enabling fitting attached in series with a second dual containment enabling fitting forming a dual containment fluid transference conduit between them.

The thus described configuration of the port plate assembly allows connections to the dip tube 34 to be made at external surfaces on the container 12, so that the connection may be made in the field at the point of consumption. Also, the connection can be accomplished without the need for a threaded fitting, insert fitting, complicated locking device, O-Ring, gasket, or other sealing mechanism, and without the need for an internal spout. The dual containment port configuration thus described may be accessed either by a single discharge tube connected to the remaining small diameter barb 46 on the fitting, or the discharge tube may also be covered with a second covering sheath in a dual containment fluid transmission conduit arrangement when the port is connected to another such dual containment port system as depicted in FIG. 3. Due to the unique dual containment enabling fitting 40 and the advantageous configuration of the system, the leakage problems of the O-Ring are eliminated, the port is more compatible with existing configurations in the industry, and the port may be accessed in the field in a sterile, simple, and inexpensive manner.

The system of the present invention also provides for other advantageous applications. As depicted in FIG. 3, a second dual containment enabling fitting 70 of similar construction to the fitting 40 described above may be utilized in conjunction with the first dual containment enabling to create a dual containment fluid transference conduit 72. In order to do so, the second fitting 70 is connected in series with the first fitting 40, by an inner section of tubing 74 having a first diameter corresponding approximately to the diameter of the conduit section 42 of the fitting 40 and the corresponding conduit section of the second fitting 70. This is done by attaching one end of the inner section of tubing to a small diameter barb 46, the first fitting 40 and the other end to a small diameter barb 76 of the second fitting. An outer section of tubing 78 of a diameter greater than the inner section of tubing 74 is also connected to the corresponding large diameter barb 60, 80 of each fitting 40, 70, encompassing and encasing the inner section of tubing. This creates a dual lumen transference conduit 72 with the inner section 74 and the outer section 78 of tubing serving as the lumen walls. Fluid is passed through the inner lumen 82 created by the inner tubing 74, while the second lumen 84 between the inner section of tubing 74 and the outer section of tubing 78 creates a secondary barrier or containment area. The second lumen 84 is a safety mechanism, used to catch any leakage from the inner lumen 82. Dual containment conduit is safer because two layers of tubing must fail before contaminants may enter the inner lumen 82 or, conversely, before the contents within inner lumen 82 can be emitted to the outside environment. While the dual containment conduit 72 thus described is beneficial for use in connection with the port plate assembly system of FIG. 1 as described above, it should be seen that the conduit 72 could also be used independent of the port plate assembly system.

The secondary containment area of the outer lumen 84 is also useful for applications that may need to be performed on fluid 16 passing within the inner lumen 82. With the use of two or more T-Joints 86 in the outer layer of tubing 78, attached to exterior access tubes 88, 92, the secondary containment area 84 may be flooded with heated or cooled liquids, thus causing a heating or cooling effect on the fluids 16 being transferred within the inner lumen 82. In addition, by using a gas permeable tubing as the inner tubing section 74, the secondary containment area 84 may be used as a gas transfer chamber, whereby gas may be pumped into the secondary containment area 84 through the exterior access tube 88 and be incorporated into the fluid 16 within the inner tubing 74, or whereby gas may be sucked out of the secondary containment area 84, thus releasing gases present in the fluid 16 within the inner tubing 74.

The secondary containment area may also be used as a conduit for passing fluid in a coaxial flow arrangement. In this arrangement, either the same fluid as is flowing through the inner section of tubing or a second body of fluid may be passed through the secondary containment area, either in the same or in the opposite direction as the inner fluid flow.

One particularly advantageous use for the present invention is to use the system with a dual containment container as described above. Two port plate assembly systems of the present invention are then utilized, one to access the inner mixing bag, and one to access the outer storage bag. The inner mixing bag is accessed at a location where the inner bag is adjacent to the outer bag and the port plate is attached directly through the outer storage bag and into the inner storage bag, as disclosed in U.S. Pat. No. 5,350,080. The powdered media within the mixing chamber is reconstituted by adding water, and a pump is then used to draw the liquid out of the mixing bag and through a first port configured as described above, whereby it is then passes through a sterilization filter. The sterile fluid is then returned to the outer storage bag through a second above-described port. The sterile fluid 16 may be accessed using the port that was used to fill it, or a third port may be used. A fourth port system may be used as a vent. Since the system described is relatively inexpensive, it may be disposed of after use, eliminating the need for expensive on-site sterilization procedures.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A fitting for enabling sterile fluid coupling of a first inner tube contained within a first outer tube to a second inner tube contained within a second outer tube, each of the inner tubes and the outer tubes having a lumen extending therethrough, the fitting comprising:

(a) a body having a first end, a second end, and an exterior surface extending therebetween, the body also having an interior surface defining a channel extending between the first end and the second end;

(b) a first small diameter barb encircling and radially projecting out on the exterior surface of the body at the first end thereof, the first small diameter barb being configured to enable a sealed fluid communication with the first inner tube when received within the lumen thereof;

(c) a second small diameter barb encircling and radially projecting out on the exterior surface of the body at the second end thereof, the second small diameter barb being configured to enable a sealed fluid communication with the second inner tube when received within the lumen thereof; and (d) a first large diameter barb encircling and radially projecting out on the exterior surface of the body between the first small diameter barb and the second small diameter barb, the first large diameter barb having an outside diameter larger than the outside diameter of the first small diameter barb and being configured to enable a sealed fluid communication with the first outer tube when the first inner tube, the first small diameter barb, and the first large diameter barb are contained within the lumen of the first outer tube, the first enlarged barb also being configured so that when the first inner tube is contained within the first outer tube a space is formed therebetween which is sealed closed at the fitting.

2. A fitting as recited in claim 1, further comprising a second large diameter barb encircling and radially projecting out on the exterior surface of the body between the first large diameter barb and the second small diameter barb, the second large diameter barb having an outside diameter lager than the outside diameter of the second small diameter barb and being configured to enable a sealed fluid communication with the second outer tube when the second inner tube, the second small diameter barb, and the second large diameter barb are contained within the lumen of the second outer tube, the second large diameter barb also being configured so that when the second inner tube is contained within the second outer tube a spaced is formed therebetween which is sealed closed at the fitting.

3. A fitting as recited in claim 1, further comprising an annular stop ridge encircling and radially extending out from the exterior surface of the body between the first large diameter barb and the second small diameter barb, the stop ridge having an outside diameter larger than the outside diameter of the first large diameter barb.

4. A fitting as recited in claim 3, wherein the stop ridge has a flat side to prevent rotation of the fitting on a flat surface.

5. A fitting as recited in claim 1, further comprising a rib encircling and radially projecting out from the exterior surface of the body between the first large diameter barb and the stop ridge, the rib having an outside diameter smaller than the outside diameter of the first large diameter barb.

6. A firing as recited in claim 1, wherein the fitting has a unitary construction.

7. A system for transferring sterile fluids, the system comprising:

(a) a flexible inner tube having a first end, a second end, and an interior surface defining a lumen extending therethrough;

(b) a flexible outer tube having a first end, a second end, and an interior surface defining a lumen extending therethrough;

(c) a fitting comprising:
(i) a body having a first end, a second end, and an exterior surface extending therebetween, the body also having an interior surface defining a channel extending between the first end and the second end;
(ii) a first small diameter barb encircling and radially projecting out on the exterior surface of the body at the first end thereof, the first small diameter barb being received within the lumen at the first end of the inner tube to form a seal fluid communication therewith; and
(iii) a first large diameter barb encircling and radially projecting out on the exterior surface of the body between the first small diameter barb and the second end of the body, the first large diameter barb being received within the lumen at the first end of the outer tube to form a seal fluid communication therewith when the inner tube is received within the lumen of the outer tube;

(d) a fluid container comprising:
(i) a first bag having a internal chamber; and
(ii) a second bag having a internal chamber, the second bag being received within the internal chamber of the first bag; and (e) a port plate attached to the first bag, the port plate having a barbed spout formed thereon with a passageway extending through the barbed spout and into the internal chamber of the second bag, the barbed spout being received within the lumen at the second end of the outer tube to form a seal fluid communication therewith and the second end of the inner tube extending through the passageway in the barbed spout so as to be in fluid communication with the internal chamber of the second bag.

8. A system for transferring sterile fluids, the system comprising:

(a) a flexible inner tube having a first end, a second end, and an interior surface defining a lumen extending therethrough;

(b) a flexible outer tube having a first end, a second end, and an interior surface defining a lumen extending therethrough;

(c) a fitting comprising:
(i) a body having a first end, a second end, and an exterior surface extending therebetween, the body also having an interior surface defining a channel extending between the first end and the second end;
(ii) a first small diameter barb encircling and radially projecting out on the exterior surface of the body at the first end thereof, the first small diameter barb being received within the lumen at the first end of the inner tube to form a seal fluid communication therewith; and
(iii) a first large diameter barb encircling and radially projecting out on the exterior surface of the body between the first small diameter barb and the second end of the body, the first large diameter barb being received within the lumen at the first end of the outer tube to form a seal fluid communication therewith when the inner tube is received within the lumen of the outer tube;

(d) a fluid container comprising:
  (i) a first bag having a internal chamber; and
  (ii) a second bag having a internal chamber, the second bag being received within the internal chamber of the first bag; and
(e) a port plate attached to the first bag, the port plate having a barbed spout formed thereon with a passageway extending through the barbed spout and into the internal chamber of the first bag, the barbed spout being received within the lumen at the second end of the outer tube to form a seal fluid communication therewith and the second end of the inner tube extending through the passageway in the barbed spout so as to be in fluid communication with the internal chamber of the first bag.

9. A system for enabling fluid coupling comprising:

a first outer tube having a lumen extending therethrough;

a first inner tube having a lumen extending therethrough and contained within the first outer tube;

a second inner tube having a lumen extending therethrough; and a fitting for enabling sterile fluid coupling of the first inner tube to the second inner tube, the fitting comprising:
  (a) a unitary body having a first end, a second end, and an exterior surface extending therebetween, the body also having an interior surface defining a channel extending between the first end and the second end;
  (b) first attachment means formed on the exterior surface of the body at the first end thereof for connecting the first inner tube in sealed fluid communication with the first end of the channel;
  (c) second attachment means formed on the exterior surface of the body at the second end thereof for connecting the second inner tube in sealed fluid communication with the second end of the channel; and
  (d) first coupling means formed on the exterior surface of the body between the first attachment means and the second attachment means for enabling the first outer tube to be attached in a sealed closed connection to the unitary body and the first coupling means and the first attachment means being configured so that when the first inner tube and the first attachment means are received within the first outer tube a containment space is formed, the sealed closed connection precluding fluid communication from the first outer tube through the fitting.

10. A system as recited in claim 9, further comprising:

a second outer tube having a lumen extending therethrough; and a second coupling means formed on the exterior surface of the fitting body between the first coupling means and the second attachment means for enabling the second outer tube to be attached in a sealed closed connection to the unitary body when the second inner tube and the second attachment means are received within the second outer tube, the sealed closed connection precluding fluid communication between the first outer tube and the second outer tube.

11. A system as recited in claim 9, wherein the first attachment means comprises a first small diameter barb encircling and radially projecting out on the exterior surface of the body at the first end thereof, the first small diameter barb being configured to enable a sealed fluid communication with the first inner tube when received within the lumen thereof.

12. A system as recited in claim 9, wherein the second attachment means comprises a first small diameter barb encircling and radially projecting out on the exterior surface of the body at the first end thereof, the first small diameter barb being configured to enable a sealed fluid communication with the first inner tube when received within the lumen thereof.

13. A system as recited in claim 9, wherein the first coupling means comprises a first large diameter barb encircling and radially projecting out on the exterior surface of the body between a first small diameter barb projecting out on the exterior surface of the body and a second small diameter barb projecting out on the exterior surface of the body, the first large diameter barb having an outside diameter larger than the outside diameter of the first small diameter barb and being configured to enable a sealed fluid communication with the first outer tube when the first inner tube, the first small diameter barb, and the first large diameter barb are contained within the lumen of the first outer tube.

14. A system as recited in claim 10, wherein the second coupling means comprises a second large diameter barb encircling and radially projecting out on the exterior surface of the body, the second large diameter barb being configured to enable a sealed fluid communication with the second outer tube when the second inner tube and the second large diameter barb are contained within the lumen of the second outer tube.

15. A system as recited in claim 9, wherein the unitary body is made of plastic.

16. A system as recited in claim 9, wherein the fitting body further comprises a stop ridge encircling and radially extending out from the exterior surface of the body between the first coupling means and the second attachment means, the stop ridge being configured to act as a stop for the first outer tube when the first outer tube passes over the first coupling means.

17. A system as recited in claim 16, wherein the stop ridge has a flat side that prevents rolling of the fitting on a flat surface.

18. A system as recited in claim 16, wherein the fitting body further comprises a rib encircling and radially projecting out from the exterior surface of the body between the first coupling means and the stop ridge, the rib having an outside diameter smaller than the outside diameter of the stop ridge.

* * * * *

UNITED STATES PATENT AND TRADEMARK OFFICE
CERTIFICATE OF CORRECTION

PATENT NO. : 5,687,993
DATED : November 18, 1997
INVENTOR(S) : Larry H. Brim

It is certified that error appears in the above-indentified patent and that said Letters Patent is hereby corrected as shown below:

Cover Page, U.S. Patent Documents, Patent No. 4,922,971, change "Grantnam" to --Grantham--

Col. 8, line 22, after "T-Joints" change "86" to --86, 90,--

Col. 9, line 42, after "diameter" change "lager" to --larger--

Col. 9, line 64, after "A" change "firing" to --fitting--

Col. 10, line 27, after "having" change "a" to --an--

Col. 10, line 28, after "having" change "a" to --an--

Col. 11, line 2, after "having" change "a" to --an--

Col. 11, line 3, after "having" change "a" to --an--

Signed and Sealed this

Seventh Day of July, 1998

Attest:

BRUCE LEHMAN

*Attesting Officer*  *Commissioner of Patents and Trademarks*